US010628669B2

United States Patent
Enzinger

(10) Patent No.: US 10,628,669 B2
(45) Date of Patent: Apr. 21, 2020

(54) METHOD AND APPARATUS FOR DETECTION OF A PRINT MARK

(71) Applicant: B&R INDUSTRIAL AUTOMATION GMBH, Eggelsberg (AT)

(72) Inventor: Thomas Enzinger, Altheim (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 14/918,911

(22) Filed: Oct. 21, 2015

(65) Prior Publication Data

US 2016/0125238 A1    May 5, 2016

(30) Foreign Application Priority Data

Oct. 27, 2014 (AT) ................ A50768/2014

(51) Int. Cl.
*G06K 9/00* (2006.01)
*B41F 33/00* (2006.01)
*G06K 9/18* (2006.01)

(52) U.S. Cl.
CPC ...... *G06K 9/00496* (2013.01); *B41F 33/0081* (2013.01); *G06K 9/18* (2013.01); *B41P 2233/52* (2013.01)

(58) Field of Classification Search
CPC .................. G06K 9/2054; G06K 9/00496
USPC ............................................ 399/16
See application file for complete search history.

(56) References Cited

U.S. PATENT DOCUMENTS

| 4,142,105 A * | 2/1979 | Erdmann | B41F 33/0081 |
| | | | 250/208.6 |
| 4,264,957 A * | 4/1981 | Pautzke | B41F 13/025 |
| | | | 101/248 |
| 4,994,975 A * | 2/1991 | Minschart | B41F 13/025 |
| | | | 101/248 |

(Continued)

FOREIGN PATENT DOCUMENTS

| DE | 20 2011 050 286 | 9/2011 |
| EP | 1 947 522 | 7/2008 |

OTHER PUBLICATIONS

European Search Report conducted in counterpart Europe Appln. No. 15 17 9713 (dated Mar. 8, 2016) (w/ partial English language translation).

(Continued)

*Primary Examiner* — Anthony H Nguyen
(74) *Attorney, Agent, or Firm* — Greenblum & Bernstein, P.L.C.

(57) ABSTRACT

A method for detection of print marks by evaluation of a cyclical sensor signal (S) from at least one contrast sensor, which senses an area of printed material containing a print mark that passes below the contrast sensor. The method includes forming a first derivation (S') of the cyclical sensor signal (S); determining a first edge region in a region where the first derivation (S') falls below a lower threshold value; determining a second edge region in a region where the first derivation (S') exceeds an upper threshold value; determining characteristic values for the first edge region and the second edge region; associating a print mark detection between the first edge region and the second edge region based on the determined characteristic values; and generating at least one output value which is representative of the print marks.

12 Claims, 5 Drawing Sheets

(56) References Cited

U.S. PATENT DOCUMENTS

| | | | | |
|---|---|---|---|---|
| 5,298,728 A | * | 3/1994 | Elliott | G06K 7/10851 235/462.27 |
| 5,952,644 A | | 9/1999 | Barkan | |
| 6,000,616 A | | 12/1999 | Spitz | |
| 6,199,480 B1 | * | 3/2001 | Leonhardt | B41F 33/0081 101/181 |
| 6,547,142 B1 | * | 4/2003 | Goren | G06K 7/10851 235/462.01 |
| 8,059,145 B2 | | 11/2011 | Ueda et al. | |
| 2005/0274809 A1 | * | 12/2005 | Colley | G06K 7/10851 235/462.25 |
| 2006/0071078 A1 | * | 4/2006 | Olmstead | G06K 7/10851 235/462.01 |
| 2006/0203642 A1 | * | 9/2006 | Kakimoto | G11B 7/0062 369/47.31 |
| 2008/0174834 A1 | | 7/2008 | Ueda et al. | |
| 2010/0329760 A1 | * | 12/2010 | Nishida | G01P 3/486 399/396 |
| 2011/0206398 A1 | | 8/2011 | Isoda et al. | |
| 2012/0050710 A1 | * | 3/2012 | Oishi | G03B 27/521 355/72 |
| 2012/0070160 A1 | * | 3/2012 | Aoki | G03G 15/5029 399/16 |

OTHER PUBLICATIONS

Austria Search Report conducted in counterpart Austria Appln. No. A 50768/2014 (dated Jun. 11, 2015).

* cited by examiner

METHOD AND APPARATUS FOR DETECTION OF A PRINT MARK

CROSS-REFERENCE TO RELATED APPLICATIONS

The present application claims priority under 35 U.S.C. § 119(a) of Austria Patent Application No. A50768/2014 filed Oct. 27, 2014, the disclosure of which is expressly incorporated by reference herein in its entirety.

BACKGROUND OF THE INVENTION

1. Field of the Invention

The invention relates to a method for detection of print marks by evaluation of a cyclical sensor signal from at least one contrast sensor which senses the area of printed material containing the print mark which is passed below the contrast sensor. The invention further relates to a device for detection of print marks with a sensor arrangement and a signal conditioning unit, wherein the sensor arrangement has at least one contrast sensor which for generation of a cyclical sensor signal is disposed above the area of printed material containing the print mark which is passed below the contrast sensor.

2. Discussion of Background Information

Print marks are used not only in the printing industry, but also in many other areas of the processing industry, for instance in order to monitor the alignment of packaging material in packaging machines and to detect and to compensate for any deviations. In the case of printing machines, for instance rotary or offset printing machines for sheet-fed or web printing, print marks are usually used in order to coordinate the different printing inks to be applied exactly with one another. Slight deviations of the print mark positions are compensated for automatically by the respective printing machine during the application of the next printing ink. Print marks are detected by so-called contrast sensors. With the aid of a light-sensitive component these contrast sensors generate an analogue signal, the strength of which corresponds to the color gradient of the print mark. With the aid of a programmable switching threshold an output signal is generated from which the start or end time of the print mark can be derived. The position or the width of the print mark can be calculated by means of the determined times and the current relative speed between the contrast sensor and the print mark. These values are provided to the processing or printing machines for position alignment.

By special shapes of the print mark, for example as wedge or double-wedge print marks, it is possible to detect not only the offset in the feed direction, but also the lateral offset of the printed material by evaluation of one single sensor signal from a contrast sensor.

In order to be able to evaluate the sensor signal from a contrast sensor more securely, it is necessary to calibrate this sensor or the unit which evaluates the sensor signal thereof for generation of the print mark signal, wherein in particular the switching threshold must be adapted to the respective environmental conditions, the contrast and the quality of the print mark and to the respective contrast sensor used in order to be able to detect the print mark clearly. In addition, when the printing machine, packaging machine or other machine is started up a parameterization has to be carried out initially. In this case a measuring window is usually defined in the cyclical signal pattern in which the print mark is to be detected. An incorrect calibration and/or an unsuitable parameterization can give rise to considerable costs if the errors are recognized too late.

Understandably, the problems which arise in the detection of print marks and in the evaluation of the sensor signals increase as the feeding speed of the printed material increases.

SUMMARY OF THE EMBODIMENTS

In the context of the present invention "printed material" designates a material on which a print mark to be detected is located, regardless of whether the printed material is printed in the respective application, or whether it is used in another way, for instance in packaging material which is fed to a packaging machine.

In the context of the present description "parameterization" designates all changes to parameters which are usually undertaken immediately before and during the starting up of a machine with regard to the print mark recognition, in particular the setting of the measuring window. In the context of the present description "calibration" designates all other changes to parameters and settings which have to be undertaken in order to make print mark recognition possible with a predetermined apparatus.

In the context of the present description "signal" or "sensor signal" designates an analogue or digital signal generated by a contrast sensor or an analogue or digital signal which is representative of such a signal.

Several problems which occur in the prior art in print mark recognition are summarized briefly below:

For each new combination of print mark and contrast sensor the switching threshold for the detection of a print mark must be newly determined, i.e. a new calibration must be carried out.

In the event of changes to the signal a static switching threshold can lead to incorrect measurements.

Noisy sensor signals have a strong impact on the result.

In the case of weak print marks with a low signal-to-noise ratio, robust measurement is no longer possible.

The effects of extraneous light, temperature and/or vibration can change the result.

Changes to the intensity of the print mark influence the result.

The methods currently used do not provide any possibility of detecting the quality, in particular the geometric quality of a print mark.

Once a printing machine or packaging machine is started up, a change in the conditions can lead to the initially correctly detected print mark suddenly no longer being correctly identified, and therefore can lead to the machine producing rejects unnoticed over a relatively long time. It would be desirable to be able to notice such errors at an early stage, even before the error affects the production quality.

The present invention is directed to overcoming the above-mentioned disadvantages as well as other disadvantages of the prior art. In particular the time for a reliable calibration and/or parameterization should be reduced, wherein any calibration and/or parameterization errors should be recognized quickly and directly. In this case the invention should enable a reliable print mark recognition even in the event of a new combination of contrast sensor and print mark, without a new switching threshold having to be determined beforehand. Furthermore, according to the invention it should be possible to determine and evaluate the quality of a print mark in order that any changes which may lead to an incorrect print mark evaluation can be recognized and eliminated at an early stage.

According to the invention this and other objects are achieved by a method which has the following steps: forming a first derivation of the sensor signal; determining a first edge region in a region where the first derivation falls below a lower threshold value; determining a second edge region in a region where the first derivation exceeds an upper threshold value; determining characteristic values for the first edge region and the second edge region; placing a print mark detection between the first edge region and the second edge region on the basis of determined characteristic values; and generating at least one output value which is representative of the print marks on the basis of the print mark detection. The method enables the detection of print marks on the basis of a geometric analysis of the sensor signal, without a switching threshold coordinated with the type of print mark and the contrast sensor used having to be defined beforehand.

In the context of the present invention the "lower" threshold value for the first derivation is deemed to be the threshold value which is disposed in the direction of a change to the sensor signal which characterizes the transition from a region without a print mark into the region of a print mark. Without limiting the invention thereto, this transition is usually a transition from a light to a dark region. When the slope of the first edge of a print mark signal is negative, the lower threshold value for the first derivation corresponds to a negative value, and when the slope of the first edge is positive the lower threshold value corresponds to a positive value.

In an advantageous embodiment the lower threshold value and/or the upper threshold value may be dynamic threshold values which are determined on the basis of the first derivation. To this end the dynamic lower and upper threshold values can be calculated in each case from the maximum of the first derivation. Thus these threshold values continuously adapt to the signal shape or the slope of the signal edges. With the aid of one parameter the user can set the two threshold values relative to the maximum of the first derivation. This parameter is usually set to approximately 10%, i.e. the "upper" or "lower" threshold value corresponds to 10% of the negative or positive maximum respectively of the first derivation. The detection sensitivity is set with the aid of this parameter. In tests, this method has proved extraordinarily stable, so that for most applications this percentage factor does not have to be adapted.

In the region of the print mark the characteristic pattern of a sensor signal, which is usually evaluated during detection of a print mark, has a first edge at the start of the print mark, a substantially linear pattern in the region of the print mark and a second edge at the end of the print mark. However, one such characteristic pattern does not inevitably indicate the actual presence of a print mark, but it can also occur in the event of signal errors or in the event of interfering marks.

In the context of the present description "print mark detection" designates the finding that a pattern which is characteristic for a print mark actually represents a print mark.

In the context of the present disclosure "interfering mark" designates a source of errors which results in a sensor signal pattern which can lead to an incorrect print mark detection. Sources of errors may include material transitions, cut edges, dirt, misprints or the like.

The intersection points between the first derivation and the upper and lower threshold values can be determined for example as characteristic values. If required, characteristic values can also be determined for the period of time during which values lie below or exceed the threshold values and/or for the distance between the first and second edge regions. In this case the detection of a print mark can be made dependent upon properties of specific characteristic values.

Furthermore the method according to the invention can advantageously include the following steps: forming a second derivation of the sensor signal; determining the zero crossing of the second derivation of the sensor signal in the first edge region; determining the zero crossing of the second derivation of the sensor signal in the second edge region; associating a print mark detection between the first zero crossing and the second zero crossing. This enables a simple and exact determination of the print mark boundaries using simple signal filters.

In a preferred embodiment of the method according to the invention the at least one output value which is representative of the print mark can be selected from a print mark position, a print mark width, a print mark contrast value, and/or a quality value, in particular a value for the base quality and/or a value for the quality of symmetry and/or a combined quality value. The invention can be adapted to varied operating conditions by selection of a combination of output values suitable for the respective application.

The evaluation of the cyclical sensor signal can advantageously take place in a measuring window preferably defined by a user. The measuring window can be defined for example on the basis of a user selection. Regions outside the measuring window are not taken into consideration in the signal evaluation, so that regions with interfering marks can be excluded from the evaluation by suitable selection of the measuring window.

According to the invention, in an advantageous embodiment the measuring window can be determined by evaluation of at least one first cycle of the cyclical sensor signal. In this case for example when the machine is started up the cyclical sensor signal can be presented on a user interface, wherein the user immediately obtains an impression of the quality of the measured sensor signal, and can select the region of the sensor signal (i.e. the measuring window) in which the print mark is to be detected. This procedure enables a very quick, simple and intuitive parameterization, wherein the production of rejects potentially occurring during the start-up of the machine can be minimized.

The exact size and/or position of the measuring window can be adapted automatically according to the invention to a detected print mark signal, wherein either the entire pattern of the cyclical sensor signal is taken into consideration, or the user-defined measuring window can be adapted with regard to its position and/or length on the basis of the print mark signal.

In an advantageous embodiment the sampling rate used for digitization of the sensor signal can be synchronized with the speed of the printed material. As a result the number of measurement points of a measuring window (or a print mark) is identical in each cycle, since each digitization step corresponds to a specific unit of length. Simple and fast 1D signal filters can then be used for the signal evaluation.

In the context of the present disclosure a "filter" is deemed to be any device which converts one (or more) input signal(s) into one (or more) output signal(s) on the basis of an algorithm.

Filters of which the output signal(s) is (are) determined on the basis of one single input signal are designated as 1D signal filters. In relation to the present invention this means that 1D filters do not have to take account of the acceleration and speed of the printed material, since each step between two signal values always corresponds to the same stretch of path and thus no longer has to be recalculated. This constant path distance of the print mark between two digitization steps is also designated as measurement resolution.

A further problem, which is solved by the discrete-path digitization steps, is the time lag which occurs when mean value filters are used during the acceleration, that is to say when the machine is started up. In the case of a discrete-time digitized sensor signal with constant time steps, complex calculations are necessary in order to be able to calculate the effects of the acceleration from the sensor signal or to compensate for the effects. Due to a discrete-path scanning rate the length of each print mark corresponds to the same number of time steps or measurement points, regardless of the speed. In each case the relative speed of the print mark with respect to the contrast sensor is designated as the "speed of the print mark".

The measurement resolution may advantageously be in a range between 2 and 100 μm, preferably in a range from approximately 3 to 4 μm. This range enables secure detection of conventional print marks even at high feeding speeds.

In an advantageous embodiment of the present method, at least one quality value, preferably a value for the base quality and/or a value for the symmetry quality, can be determined for the detection of print marks. Such quality values, which are determined with the aid of the filters used according to the invention, enable a continuous monitoring of the print mark detection. A change in the quality values may give an early indication of sources of errors, so that an error correction is possible even before the error leads to the production of rejects. During the calibration the quality values can be used in order for instance to quickly notice an incorrect selection of the measuring window, for instance if the measuring window has not been defined in the print mark, but erroneously in an interfering mark.

In order to generate a result which can be used for a register control from the position or width of a print mark, either an absolute or a relative measuring method can be used. In the absolute measurement an individual contrast sensor is used and as a result the difference in position is formed between an output value representative of the print mark and a virtual offset. In this case mechanical, thermal and other systemic errors have a relatively strong impact on the measurement result. In a relative measurement, on the other hand, two contrast sensors are used which are mechanically firmly connected to one another, the distance between the two contrast sensors corresponding to the distance between the print marks. The difference in position of the two marks is formed as a result. In this case the advantage is that different disturbance variables generally have the same strong impact on both measurement branches and are eliminated by the formation of the difference. Thus a substantially higher precision can be achieved.

Therefore in a preferred embodiment a difference value can be formed between an output value which is determined from the sensor signal from a first contrast sensor and is representative of a first print mark and an output value which is determined from the sensor signal from a second contrast sensor and is representative of a second print mark.

The invention further relates to an apparatus referred to in the introduction for detection of print marks, of which the signal conditioning unit has at least one filter unit with a first filter for determination of the first derivation of the sensor signal, wherein on the basis of an evaluation of at least the first derivation of the sensor signal the filter unit generates at least one output value which is representative of the print mark. The method according to the invention can be advantageously implemented in practice with the aid of such an apparatus.

In an advantageous manner the filter unit can also have a second filter for determination of the second derivation of the sensor signal, wherein on the basis of an evaluation of the first and second derivations of the sensor signal the filter unit generates the output value which is representative of the print mark.

In a preferred embodiment the signal conditioning unit can have a central calculation unit which determines a sampling rate coordinated with the speed of the printed material and passes on this sampling rate to an analogue-digital converter for the sensor signal. In this way the sampling rate is adapted to the respective speed of the apparatus, which simplifies and speeds up the evaluation.

Simple, cost-effective and fast-working filters can be used for the formation of the derivations, the signal smoothing, the signal evaluation and/or the calculation of the quality values, wherein the filters used by the filter unit are advantageously 1D filters.

In a further advantageous embodiment the sensor arrangement can have two contrast sensors disposed one behind the other in the feed direction of the printed material. In this way the contrast measurement is less prone to malfunction.

The region of the cyclical sensor signal evaluated by the filter unit can preferably be limited to one measuring window. As a result interfering marks which lie outside the measuring window are not taken into consideration. These limitation can for example be selected by the user via a user interface. The sensor signal can be presented in the user interface near the user, so that for example the selection of a measuring window can be carried out quickly and simply by marking with a mouse or by means of a touch screen.

According to a further preferred embodiment the apparatus according to the invention can have a plurality of similar filter units. Each of the filter units constitutes a specific hardware unit and can be configured and parameterized independently of the other units. In this case the filters to be used by each filter unit, the signal inputs of the filter unit and/or the output values of the filter unit depending are predetermined and configured depending upon the application. The output values output by each filter unit can for example be relayed by means of an industrial network to the user interface or to a control unit.

Even in the event of a noisy sensor signal or in the event of poor-quality print marks, with the aid of the apparatus according to the invention a print mark signal can be generated which reliably represents the position of the print marks.

Other exemplary embodiments and advantages of the present invention may be ascertained by reviewing the present disclosure and the accompanying drawing.

BRIEF DESCRIPTION OF THE DRAWINGS

The present invention is explained in greater detail below with reference to FIGS. 1 to 5, which show by way of example, schematically and without limitation, advantageous embodiments of the invention. In the drawings.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
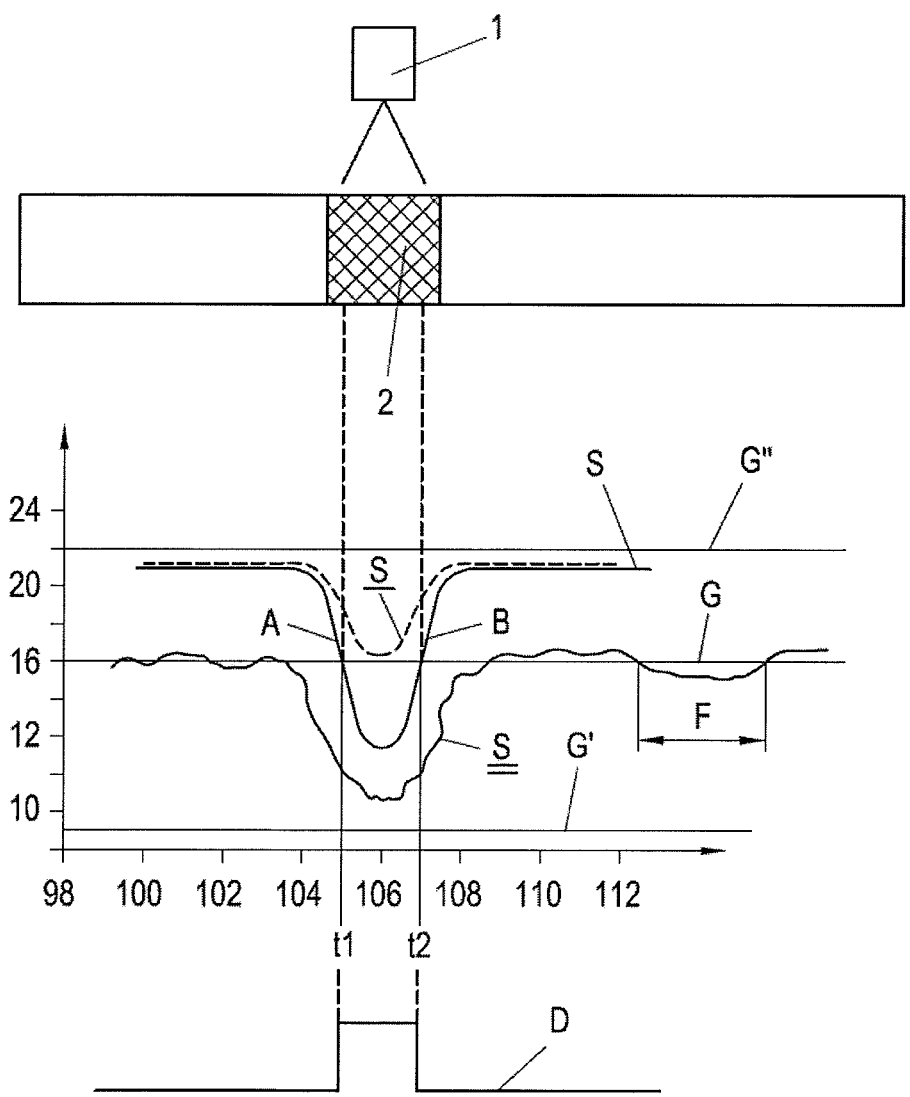
FIG. 1 shows a diagram of the pattern of a sensor signal from a contrast sensor for recognition of a print mark with a predetermined threshold value according to the prior art.

FIG. 1 shows a diagram of a typical sensor signal S from a contrast sensor 1, the signal being produced during scanning of a print mark 2. If the print mark 2 passes the contrast sensor 1, the brightness measured by the contrast sensor 1 falls significantly and rises again to the original value when the print mark 2 has left the region of the contrast sensor 1. According to the conventional method, for the detection of a print mark 2 a switching threshold G is specified for the sensor signal S, and a print mark 2 is recognized if the sensor signal S falls below this switching threshold G for a period of time which corresponds approximately to the length (in the feed direction) of the print mark 2. In the example of FIG. 1 between the points t1 and t2 the sensor signal S falls below the threshold value G, wherein a digital print mark signal D is generated which is representative of the print mark, and serves as a basis for the control of the downstream apparatus of the machine. For example on the basis of the print mark signal D the printing of a further color can be aligned exactly with the already printed color(s). In other fields of application the print mark signal D can be used in order for example to align packaging material, to cut it at points matching the imprint, to weld and/or to fold it, wherein the present invention is advantageously applicable to all types of application of print marks.

The extent of the actual reduction of the sensor signal S is dependent upon many factors, inter alia the construction and the sensitivity of the contrast sensor, the relative speed between the print mark 2 and the contrast sensor 1, the environmental conditions, the printed material, and the type and the properties of the print mark 2 itself. In the event of changed environmental conditions, e.g. if the contrast sensor 1 has been replaced, the position or the type of print marks have changed, or if the illumination situation has changed, the type of print mark detection according to the prior art shown in FIG. 1, which is based on a fixed switching threshold G, may be prone to faults.

For example, in the case of a low-contrast print mark 2 it may happen that the sensor signal S does not fall below the switching threshold G for long enough, or even does not fall below it at all, in order to be able to recognize this print mark 2 reliably. One such sensor signal of a weak print mark 2 is illustrated by way of example in FIG. 1 as a sensor signal S.

A similar problem can occur if the switching threshold is selected to be too low or too high. In the first case of a switching threshold G' which is selected to be too low, in the region of the print mark 2 the sensor signal S also does not fall below the switching threshold G', and in the second case of the switching threshold G" which is selected to be too high the sensor signal S would continuously remain below the switching threshold G", and would therefore supply no usable result.

A further possible problem can arise in the case of noisy or wavy sensor signals, as is illustrated by way of example in the sensor signal S. Although with the switching threshold G the print mark 2 can be correctly recognized, since the sensor signal S falls below the switching threshold G for a sufficiently long time, in another region F the sensor signal S also falls below the switching threshold G for a sufficiently long time, so that a print mark would be detected there too, but this is not actually present (thus this is an interfering mark). Such interfering marks can occur not only in the event of an unsuitable choice of the switching threshold, but also because of different interfering influences, such as for instance dirt or interfering light influences.

In each of these cases an apparatus according to the prior art must be recalibrated and a suitable new switching threshold must be determined and set. Also after a replacement of the contrast sensor 1 a recalibration is necessary. For calibration it is sometimes sufficient to reset the switching threshold, but this is sometimes difficult and time-consuming, and cannot be carried out during the running time of the machine, so that in this case high costs can result. Also the calibration is generally not carried out by a specialist in the field of sensor technology, but by the operator of the respective printing or processing machine, for which the solution of sensor-specific problems involves additional and undesirable expenditure.

Figure 2:
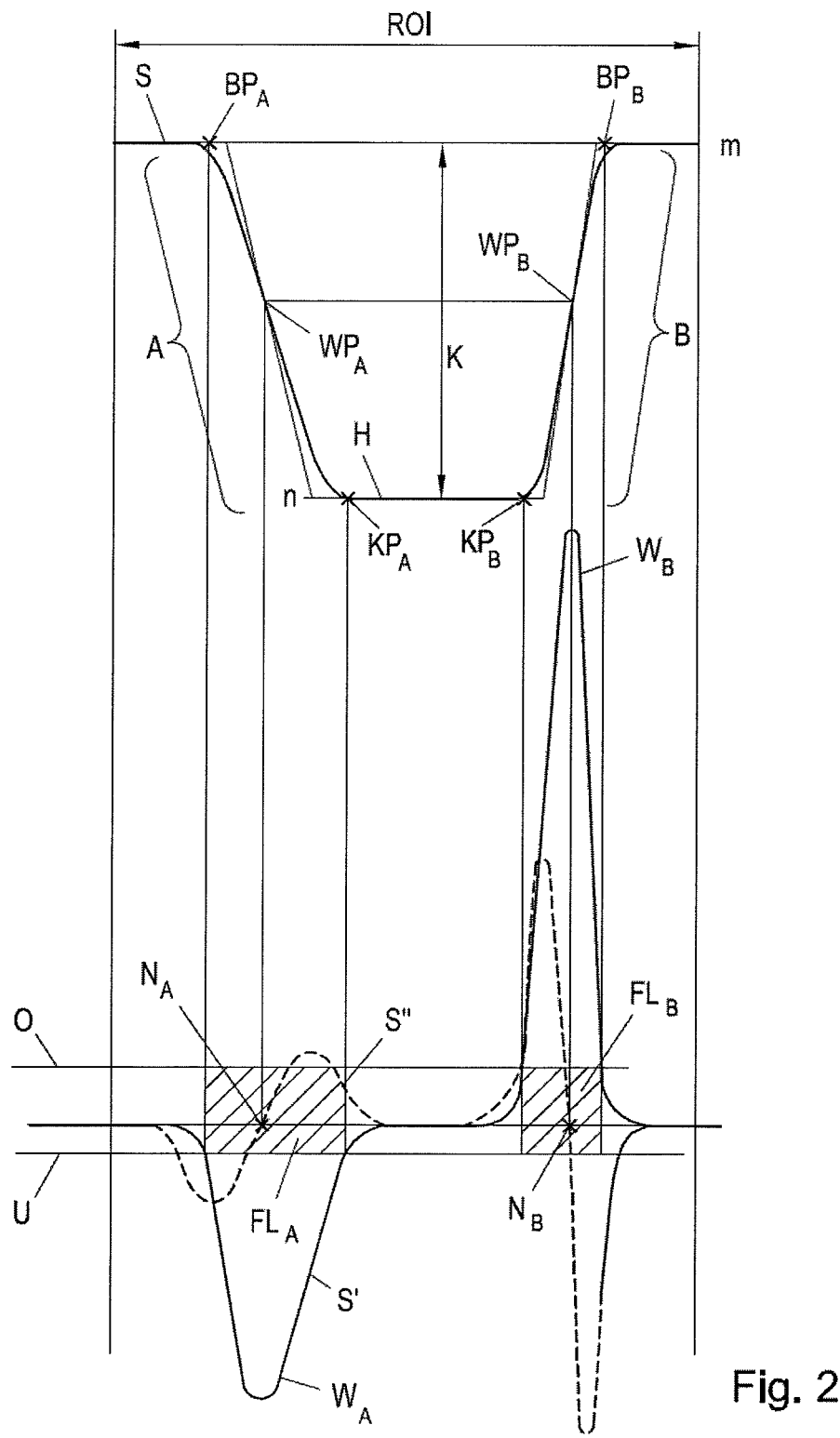
FIG. 2 shows a diagram of a sensor signal with the corresponding first and second derivations for explanation of the method according to the invention.

The objective of the method and apparatus according to the invention is to simplify the calibration so much that it can be carried out by an operator quickly, simply and potentially even while the machine is in operation. The solution according to the invention is based on the idea of not using the absolute values for the evaluation of the sensor signal S, but the values of the first or second derivation S', S" of the sensor signal S. The method according to the invention for evaluation of an analogue sensor signal S for the determination of print marks is explained with reference to FIG. 2. Starting from an upper starting value m the sensor signal S falls via a first edge A to a lower value n, if the contrast sensor 1 exceeds the boundary between the light region outside the print mark 2 and the dark region inside the print mark 2.

For the method according to the invention no predefined switching threshold is necessary, but the geometric characteristics of the sensor signal S are evaluated. In this connection a first derivation S' and a second derivation S" are formed for example with the aid of signal filters which are known per se. The falling edge A can be detected by a pronounced negative value peak $W_A$ of the first derivation S', whereas the second, rising edge B produces a positive value peak $W_B$ in the first derivation S'.

In order to be able to detect the borders of the print mark 2 as accurately as possible, a lower threshold value U and an upper threshold value O are defined for the first derivation S', wherein the threshold values U, O in each case correspond to a specific (positive or negative) slope of the sensor signal. In contrast to the switching threshold of the prior art these threshold values U, O are independent of the (absolute) signal strength, since they only reflect the geometric characteristics of the sensor signal S. A preset value previously determined in advance by tests by the supplier can be used for the threshold values U, O, the threshold values U, O can preferably be determined dynamically on the basis of the sensor signal, for example as a percentage of the maximum or minimum of the first derivation S' of the sensor signal S. As a result it will only be necessary in special cases to adjust these threshold values U, O at a later stage. In the case of a very noisy sensor signal the threshold values U, O could for example have a greater spacing, whereas they can be very close together in the case of a very smooth and interference-free pattern of the sensor signal. Furthermore a smoothing of the sensor signal and/or of the first derivation S' and/or of the second derivation S" can take place before these signals are evaluated for the detection of print marks. A smoothing of the sensor signal ensures that only sufficiently pronounced edges lead to the first derivation S' falling below the threshold value U of exceeding the upper threshold value O for a sufficiently long time in order to trigger a detection of print marks.

The characteristic shapes of the first derivation S' of the sensor signal are used for evaluation of the sensor signal, wherein in particular a negative value peak followed by a positive value peak is characteristic of a print mark 2 (the edge direction towards a lower light density may usually be regarded as "negative", but the reverse situation is also conceivable, for instance if a dark material is processed on which a light print mark is applied for better recognition). The principal difference between the upper and lower threshold values for the first derivation S' of the sensor signal S, and the switching thresholds for the sensor signal S, such as are defined in the prior art, is that according to the invention the occurrence of a print mark 2 is determined on the basis of the slope and the length of the edges A, B and not by the (absolute) deflection of the sensor signal itself.

The region in which the first derivation S' falls below the lower threshold value U defines a first edge region $FL_A$ which extends over the steepest region of the edge A. In the same way the region in which the first derivation S' exceeds the upper threshold value O defines a second edge region $FL_B$ which extends over the steepest region of the edge B. In these regions characteristic values can be determined which are characteristic of a print mark 2, and from which conclusions can be drawn concerning the quality or the presence of a corresponding print mark 2. In the simplest embodiment in order to distinguish the print mark 2 the turning points $WP_A$ and $WP_B$ of the two edges A, are determined B by determination of the respective zero crossing $N_A$ or $N_B$ of the second derivation S". In the event of a clear pronounced edge A, B there are in general precisely one turning point $WP_A$, $WP_B$ and therefore also only precisely one zero crossing $N_A$, $N_B$ of the second derivation S". Since only the turning points $WP_A$, $WP_B$ within the edge regions $FL_A$, $FL_B$ are determined, zero crossings which can occur away from the edges A, B due to signal ripples do not lead to false detection of a print mark.

The point at which the first derivation S' falls below the lower threshold value U for the first time may be regarded as the start of the region of the sensor signal S which is characteristic of the print mark 2, and in the context of the present description this point is designated as the lower base point $BP_A$. Accordingly the base point $BP_B$, which is located at the point at which the first derivation after the positive value peak falls again below the upper threshold value O, of the second edge B can be designated as the end of the region which is characteristic of the print mark 2.

In an analogous manner the head points $KP_A$ and $KP_B$ are determined, wherein the first head point $KP_A$ designates the end of the first edge A, and the second head point $KP_B$ designates the start of the second edge B. A substantially horizontal region H, which corresponds to the darker detection region in the interior of the print mark 2 (i.e. the "base" of the trough-like pattern of the sensor signal in the region of the print mark 2), extends between the first and the second head point $KP_A$, $KP_B$. A value for the contrast K of the print mark 2 can be determined from the difference between the signal strength m outside a print mark 2 and the signal strength n in the horizontal region H of the sensor signal. If the two base points $BP_A$, $BP_B$ or the two head points $KP_A$ and $KP_B$ have different values, they can be averaged in each case for the calculation of the contrast value K.

Before the sensor signal is evaluated it can be digitized in an advantageous manner, wherein the length of the time steps used for the digitization is preferably adapted to the current speed of the print mark 2.

The determined characteristic values can be used for evaluation of the quality and the symmetry of a print mark detection. A value for the base quality and a value for the symmetry quality can be determined for example for each detected print mark 2.

A value which is characteristic of the difference between the two base points $BP_A$ and $BP_B$ is designated as the "base quality". For calculation of such a value the two base points are determined and the difference between them is correlated with the contrast K. A poor base quality can indicate either an interfering mark or a print mark 2 of poorer quality, on the other hand the value for the base quality also diminishes very quickly if the print mark 2 "migrates" onto the edge of the measuring window ROI. This is because in the smoothing of signals (such as the sensor signal S, or the derivations S', S" thereof) mean value filters are used which carry out the smoothed values for the sensor signal S on the basis of a plurality of consecutive measurement points of the digital sensor signal. Thus the value of the sensor signal in each time step is based on a plurality of signal values of the unsmoothed sensor signal which are located before and after the corresponding time step. If for example the measurement resolution (that is to say the step size of the digitization) is 4 μm, the length of a print mark 2 corresponds for instance to 650 steps, and the mean value filter 25 takes account of measurement points before and after the respective time step, then the value for the base quality already changes when the region taken into account for the mean value formation moves out of the measuring window ROI, since several of the signal values used for the calculation of the smoothed value are "cut off". This already has an effect on the pattern of the digitized sensor signal used for the evaluation before the edge of the print mark 2 itself leaves the measuring window ROI. Thus after the detection of a diminishing value for the base quality there is still time left for the operator to react before the changed conditions actually affect the product quality.

A value for the symmetry of the two opposing edges A, B (that is to say the regions in which the first derivation S' of the sensor signal S is located outside the region defined by the threshold values O, U) of a pattern of a sensor signal which is characteristic of a print mark 2 is designated as the "symmetry quality". For determination of such a value an edge (for example the edge A) is "mirrored" by means of the other edge (for example the edge B) and the differential signal thereof is determined in relation to the contrast. In this case the symmetry quality reflects the sum of the differences between edge A or B, i.e. in the case of very pronounced marks with a high signal amplitude a higher differential signal is produced than in "weak" marks. If the calculated differential signal is correlated with the signal amplitude (contrast), this produces a standardized differential signal and thus a quality value which is independent of the signal strength.

A value of zero indicates a perfect symmetry with identical edge shapes. The symmetry quality is even poorer the more the value differs from zero. Printing problems or other signal disruptions are frequently revealed in an asymmetry of the sensor signal in the region of the print mark detection, so that the value for the symmetry quality is suitable for monitoring these qualities. In addition the value can be used for the recognition of interfering marks.

Figure 3A:
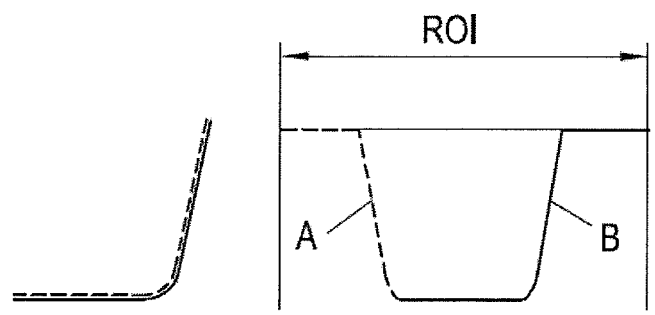
FIGS. 3a to 3c show a comparison of a plurality of sensor signal patterns with different quality values.
Figure 3B:
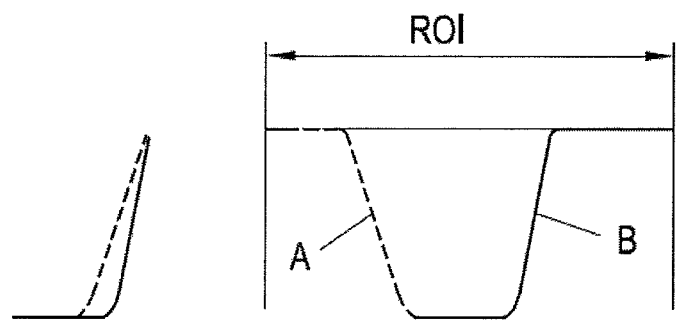
Figure 3C:
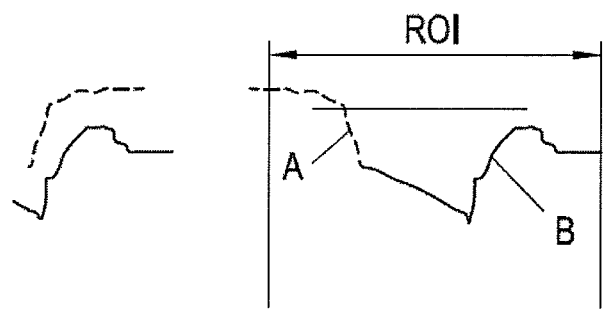

FIGS. 3a to 3c show signal patterns of three different sensor signals in a measuring window ROI, wherein in each case the two edges A, B of the region of the sensor signal which is characteristic of a print mark 2 for checking the symmetry are shown mirrored above one another on the left adjacent to the sensor signal.

FIG. 3a shows an example of a symmetrical signal pattern in which both edges A, B are virtually identical, which suggests a high quality of the sensor signal and also leads to a good value for the symmetry quality.

FIG. 3b shows an example of a slightly asymmetrical signal pattern of a sensor signal in the region of a print mark 2, wherein the two edges A, B are not exactly congruent. Accordingly the symmetry quality of the detected print mark 2 is lower than in FIG. 3a.

FIG. 3c shows an example of a sensor signal pattern produced by an interfering mark in the measurement region ROI. The edge shapes, as well as the sizes of the both edges A, B differ considerably. The symmetry quality is therefore significantly poorer than in the examples of FIGS. 3a and 3b. There are also large differences with regard to the characteristic values ($BP_A$, $WP_A$, $KP_A$) which are determined for the first edge A and the corresponding characteristic values ($BP_B$, $WP_B$, $KP_B$) which are determined for the second edge B.

Figure 4C:
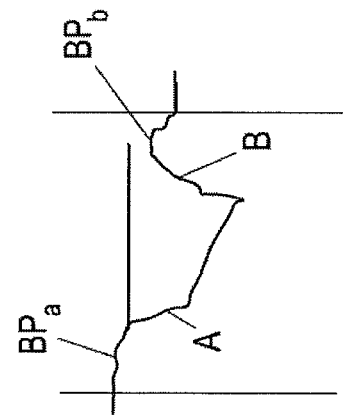
FIG. 4c shows a diagram of a signal which has been generated by an interfering mark.
Figure 4B:
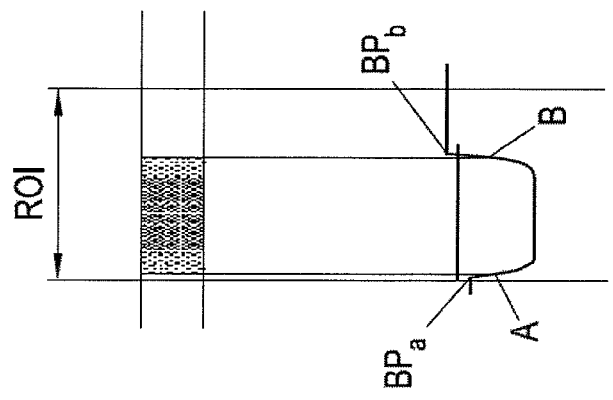
FIG. 4b shows a diagram of a print mark signal which is not centered.
Figure 4A:
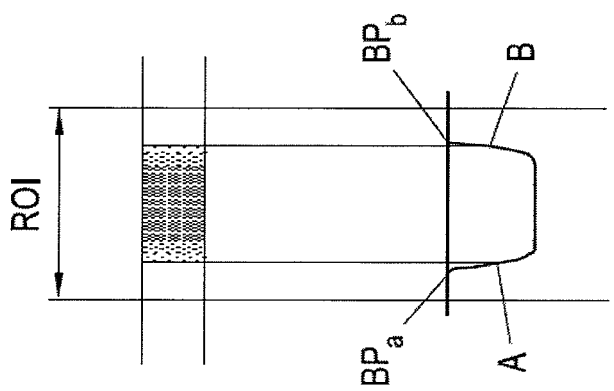
FIG. 4a shows a diagram of a print mark signal centered in the measuring window.

FIGS. 4a-4c show three examples for the determination of a base quality for a sensor signal S in a measuring window ROI in which a print mark 2 has been detected. For determination of the base quality the difference between the base points $BP_A$ and $BP_B$ of both edges A, B as well as the contrast K of the sensor signal. Then the quotient of contrast K to this difference is formed. In this way a quality value is obtained which reflects the background asymmetry of the print mark 2. A value of zero indicates an optimal base quality, wherein in this case the signal strengths of the base points $BP_A$ and $BP_B$ are identical.

FIG. 4a shows a symmetrical mark which is centered in the measuring window (ROI). Both base points $BP_A$ and $BP_B$ have substantially the same signal values. Thus since the difference between the signal values of the base points $BP_A$ and $BP_B$ is small, or nonexistent, a good value is obtained for the base quality.

By means of the base quality it is possible for example to detect whether the print mark 2 moves out of the measuring window ROI. If one of the mark edges is located too close to the edge of the measuring window, this quality value falls. Such a case is shown in FIG. 4b, in which the print mark 2 has moved to the edge of the measuring window (ROI), so that the two base points $BP_A$ and $BP_B$ are not located at the same height. In this case a low quality value is produced. It may be pointed out that the base quality of the sensor signal in FIG. 4b is already diminished if although the print mark 2 is close to the edge it is still completely inside the measuring window ROI. This is because in the position illustrated in FIG. 4b several values, which are taken into account by the mean value filter provided for smoothing for the calculation of the value of the first base point $BP_A$, lie outside the measuring window. These missing values "falsify" the signal value of the base point $BP_A$ in the smoothed sensor signal, so that the signal value of the base point $BP_a$ differs from the signal value of the base point $BP_b$, which leads to a poor value for the base quality.

FIG. 4c shows the example of the signal pattern of a sensor signal S in the case of an interfering mark. The two base points $BP_A$ and $BP_B$ have very different signal values. The base quality of the mark is correspondingly low. The fact that in addition to the base quality the symmetry quality of this sensor signal (see FIG. 3c) is also very poor, is a strong indication that this signal pattern is the basis of an interfering mark.

In practice the specifications for the respective measuring window ROI can be defined by the user, in order to coordinate it optimally with the expected position and width of the print mark 2. Depending upon the application, strategies or methods can be defined by the user which select the correct mark in the case of multiple detection. If a plurality of print marks are located in a measuring window ROI, initially all marks in the current measuring window are detected and subsequently with the aid of the defined selection method the correct mark is selected and taken into consideration in the detection of the print mark.

Figure 5:
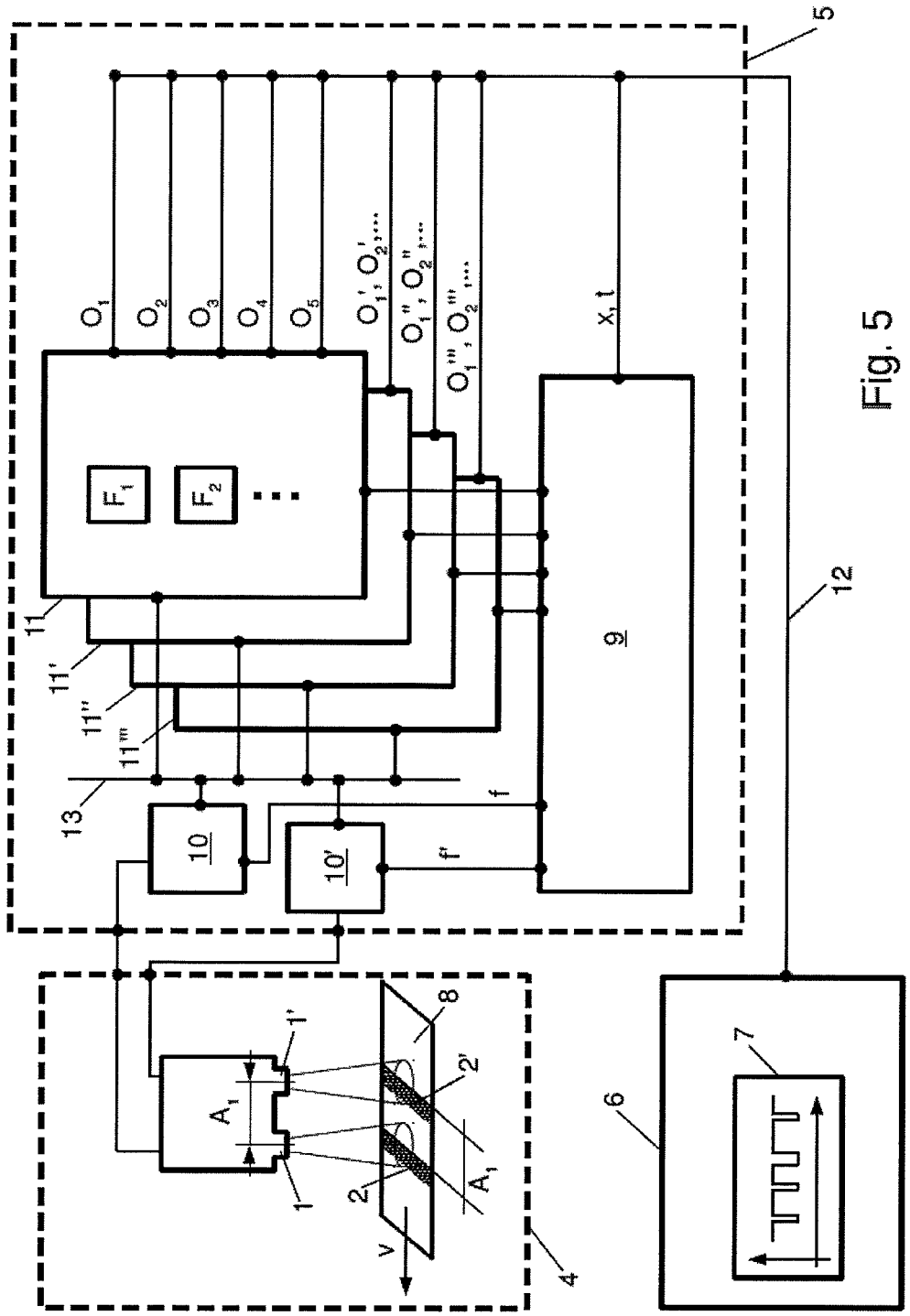
FIG. 5 shows a schematic representation of an exemplary embodiment of the apparatus according to the invention.

In FIG. 5 the essential elements of an apparatus according to the invention for detection of print marks are shown schematically. The apparatus comprises a sensor arrangement 4 and a signal conditioning unit 5. The signal conditioning unit 5 is connected by means of an industrial network 12 in connection with a control unit 6 which provides a user interface 7 for an operator. The sensor arrangement has a first and a second contrast sensor 1, 1', which is disposed directly above the printed material 8, so that the print marks 2, 2' which are present on the printed material 8 and which move along below the contrast sensors 1, 1' at a relative speed v can be detected by these sensors. Potentially only one single contrast sensor 1 can also be provided if this is sufficient for the respective objective. The two contrast sensors 1, 1' are disposed at a specific distance $A_1$ from one another which corresponds to the required distance $A_1$ of the print marks on the printed material. As a result a differential signal, which corresponds to the deviation of the print mark distance from the desired value $A_1$ and can be used for adjustment of the machine, is formed in a simple manner.

The signals from the first contrast sensor 1 and the second contrast sensor 1' are transmitted to the signal conditioning unit 5 which has a first analogue-digital converter 10 and a second analogue-digital converter 10' in which in each case a signal from one of the contrast sensors is converted into a digital signal. In this case the analogue sensor signals are converted with the aid of a predetermined sampling rate f, f into a discrete-path digital sensor signal. A "discrete-path digital sensor signal" is a discrete-time digital sensor signal of which the time steps are synchronized with the feeding speed of the print mark so that each (variable) time step corresponds to a constant stretch of path (which is traveled by the print mark 2).

The sampling rate is determined by a computer unit 9 on the basis of a path signal x and a time signal t. For the digital sensor signal this produces a measurement resolution which can be specified in a unit of length (in the direction of movement of the print mark 2). In this case the measurement resolution may advantageously be chosen appropriately according to the application in a range from approximately 2 to approximately 100 μm, preferably in a range between approximately 3 and approximately 4 μm. This measurement resolution makes it possible to find an optimal compromise between the required high processing speeds of the machine and the maximum signal clocking which can be processed by digital filters.

The signal conditioning unit 5 also has a plurality of filter units 11, wherein in the case of FIG. 5 four filter units 11, 11', 11" and 11'" are illustrated. Each of the filter units 11 is configurable as a dedicated hardware unit independently of the other filter units, wherein on the basis of a digital input signal, for example the digital sensor signal from the first contrast sensor 1 output by the first analogue-digital converter 10 and/or the digital sensor signal from the second contrast sensor 1' output by the second analogue-digital converter 10', according to the method according to the invention a series of output values $O_x$, $O_x'$, $O_x''$, $O_x'''$ can be determined and can be transmitted by means of the industrial network 12 to the control unit 6 or to other devices (not shown). In terms of hardware, the four filter units 11, 11', 11" and 11'" constitute parallel processors which in each case carry out one (or more) filter function(s) according to a specific filter algorithm. The configuration of the filter units 11, 11', 11" and 11'" may be carried out by means of the central computer unit 9.

An internal communication connection 13 is provided in order to transmit the digitized sensor signals from the analogue-digital converters 10 and 10' to the individual filter units 11, 11', 11" and 11'". Thus according to the respective configuration each of the filter units 11, 11', 11" and 11'" can access the correspondingly required sensor signal.

The functioning of the filter units 11, 11', 11" and 11'" will be described in detail with reference to an example of a configuration in relation to the first filter unit 11. The first filter unit 11 accesses the signal from the first contrast sensor 1 which is digitized by the first analogue-digital converter 10. A measuring window ROI is defined for the first filter unit 10, so that this filter only evaluates signal values which lie between a first threshold value delimiting the measuring window ROI and a second threshold value, wherein the first and the second threshold value may be specified as an indication of position, for example specified in μm. The indication of the position of the print mark may for example relate to the length of a machine part, for example the length of the circumference of a printing roller, given in μm.

The filter unit 11 has a first filter $F_1$ which smooths the signal in the measuring window ROI. Then in a second filter $F_2$ a first derivation S' of the sensor signal S is formed from the signal and in a third filter $F_3$ the second derivation S" of the sensor signal S is formed. These derivations are evaluated in further filters and according to the method according to the invention print marks are detected and the position and width of these marls are determined. Further filters may be defined in order to determine the upper threshold value O and the lower threshold value U dynamically from the first derivation, in order to determine a contrast value for a detected print mark, and/or in order to determine one or more quality values for the detected print mark.

From the sensor signal S from the first contrast sensor 1 the first filter unit 11 calculates the following output values and outputs them continuously by means of the industrial network 12:

output value $O_1$: position of the first print mark 2 [μm]
output value $O_2$: width of the first print mark 2 [μm]
output value $O_3$: contrast of the first print mark 2 [ΔV]
output value $O_4$: combined quality value of the first print mark 2 [%]
output value $O_5$: sensor signal from the first contrast sensor [V]

The combined quality value is a potentially weighted mean value of base quality and symmetry quality. All analyses of the first filter unit 11 are limited to the measuring window ROI.

In order to enable a complete evaluation of the sensor signals S of the first contrast sensor 1 and of the second contrast sensor 1', the second filter unit 11' is configured similarly to the first filter unit 11, but for evaluation of the sensor signal of the second contrast sensor 1'.

Thus the second filter unit 11' calculates the following output values and outputs them by means of the industrial network 12:

output value $O'_1$: position of the second print mark 2' [μm]
output value $O'_2$: width of the second print mark 2' [μm]
output value $O'_3$: contrast of the second print mark 2' [ΔV]
output value $O'_4$: combined quality value of the second print mark 2' [%]
output value $O'_5$: sensor signal from the second contrast sensor [V]

The evaluations of the second filter unit 11' are limited to the same measuring window ROI as those of the first filter unit 11.

The output values of the first and the second filter unit 11, 11' can be used by the control unit 6 or potentially by another regulating device for the controlling the machine. Furthermore the control unit 6 can present the sensor signals in the selected measuring window ROI as well as a characteristic of the quality values to the user interface 7 in a clear manner.

The third and fourth filter unit 11", 11'" can be configured similarly to the first and the second filter unit 11, 11', but without being limited by a measuring window ROI, wherein they evaluate the respective sensor signal over the entire range of the cyclical signal. Also this characteristic can be presented by the control unit 6 to the user interface 7 in order to enable an operator for example to selection a new measuring window ROI quickly and clearly.

The specific configurations described above of the four illustrated filter units 11, 11', 11" and 11'" are given purely by way of example and can be adapted flexibly to the respective requirements.

The control unit 6 can for example use the output values for example in order to update the presentation of the user interface 7, or in order to produce warnings, for instance when the quality values change or depart from a permissible range. If required, further output values can also be defined for one or more of the filter units 11.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for detection of print marks by evaluation of a cyclical sensor signal (S) from at least one contrast sensor, which senses an area of printed material containing a print mark that passes below the contrast sensor, the method comprising:

converting the cyclical sensor signal (S) into a discrete-path sensor signal with time steps synchronized with a feeding speed of the print mark so that each time step corresponds to a constant stretch of path traveled by the print mark;

forming a first derivation (S') of the cyclical sensor signal (S);

determining a first edge region in a region where the first derivation (S') falls below a lower threshold value;

determining a second edge region in a region where the first derivation (S') exceeds an upper threshold value;

determining characteristic values for the first edge region and the second edge region;

associating a print mark detection between the first edge region and the second edge region based on the determined characteristic values; and generating at least one output value, which is representative of the detected print mark, wherein the at least one output value, which is representative of the print mark, is selected from a print mark position, a print mark width, a print mark contrast value, and/or a quality value.

2. The method according to claim 1, wherein the lower threshold value and/or the upper threshold value are dynamic threshold values which are determined on the basis of the first derivation (S').

3. The method according to claim 1, wherein the method further comprises:

forming a second derivation (S") of the cyclical sensor signal (S);

determining the zero crossing of the second derivation (S") of the cyclical sensor signal (S) in the first edge region;

determining the zero crossing of the second derivation (S") of the cyclical sensor signal (S) in the second edge region; and associating a print mark detection between the first zero crossing and the second zero crossing.

4. The method according to claim 1, wherein the evaluation of the cyclical sensor signal (S) takes place in a measuring window.

5. The method according to claim 4, wherein the measuring window is determined by evaluation of at least one first cycle of the cyclical sensor signal.

6. The method according to claim 4, wherein a size and/or position of the measuring window is automatically adapted to a detected print mark signal.

7. The method according to claim 1, wherein a sampling rate (f, f') used for digitization of the cyclical sensor signal (S) is synchronized with a speed (v) at which the printed material is conveyed.

8. The method according to claim 1, wherein a measurement resolution is in a range between 2 and 100 μm.

9. The method according to claim 1, wherein the at least one output value comprises a first output value and a second output value, and the method further comprises forming a difference value, which is a difference between the first output value, which is determined from the cyclical sensor signal from a first contrast sensor and is representative of a first print mark, and the second output value, which is determined from the cyclical sensor signal from a second contrast sensor and is representative of a second print mark.

10. The method according to claim 1, wherein the quality value comprises at least one of a value for the base quality, a value for symmetry quality and a combined quality value.

11. The method according to claim 8, wherein the measurement resolution is in a range between approximately 3 to 4 μm.

12. The method according to claim 4, wherein the measuring window is defined by a user.

* * * * *